United States Patent
Futterlieb et al.

(10) Patent No.: US 12,397,707 B2
(45) Date of Patent: Aug. 26, 2025

(54) DRIVER ATTENTION SYSTEM

(71) Applicant: Harman Becker Automotive Systems GmbH, Karlsbad (DE)

(72) Inventors: Marcus Futterlieb, Ingolstadt (DE); Anilkumar Hariharakrishnan, Sauerlach (DE)

(73) Assignee: HARMAN BECKER AUTOMOTIVE SYSTEMS GMBH, Karlsbad-Ittersbach (DE)

( * ) Notice: Subject to any disclaimer, the term of this patent is extended or adjusted under 35 U.S.C. 154(b) by 254 days.

(21) Appl. No.: 18/311,123

(22) Filed: May 2, 2023

(65) Prior Publication Data
US 2023/0406203 A1 Dec. 21, 2023

(30) Foreign Application Priority Data

Jun. 20, 2022 (EP) ..................................... 22179889

(51) Int. Cl.
*B60Q 9/00* (2006.01)
*G06V 20/59* (2022.01)
(Continued)

(52) U.S. Cl.
CPC ............. *B60Q 9/00* (2013.01); *G06V 20/597* (2022.01); *H04R 1/025* (2013.01); *H04R 5/02* (2013.01); *H04R 2499/13* (2013.01)

(58) Field of Classification Search
CPC ........ B60Q 9/00; G06V 20/597; H04R 1/025; H04R 5/02; H04R 2499/13
See application file for complete search history.

(56) References Cited

U.S. PATENT DOCUMENTS 6,154,123 A * 11/2000 Kleinberg .............. G08B 21/06
340/576
7,301,465 B2 * 11/2007 Tengshe ................. G08B 21/06
340/576
(Continued)

FOREIGN PATENT DOCUMENTS

EP 2945133 A1 11/2015
WO 2014020465 A1 2/2014

OTHER PUBLICATIONS

L. M. Bergasa, J. Nuevo, M. A. Sotelo, R. Barea and M. E. Lopez, "Real-time system for monitoring driver vigilance," in IEEE Transactions on Intelligent Transportation Systems, vol. 7, No. 1, pp. 63-77, Mar. 2006, doi: 10.1109/TITS.2006.869598.*
(Continued)

*Primary Examiner* — Gertrude Arthur Jeanglaude
(74) *Attorney, Agent, or Firm* — McCoy Russell LLP

(57) ABSTRACT

A driver attention system is configured to determine a drowsiness level of a driver of a vehicle by means of data provided by a monitoring unit configured to determine one or more driver parameters based on the current drowsiness level, determine a current driver focus level and an estimated time of remaining driver focus level, wherein the driver focus level is inversely proportional to the drowsiness level, and determine an estimated remaining travel time until a desired destination is reached by means of data provided by a navigation system. During selected conditions, a binaural beat at 20 Hz or higher is generated via at least two first loudspeakers of an audio system of the vehicle, wherein the binaural beat is audible for the driver.

17 Claims, 3 Drawing Sheets

(51) Int. Cl.
*H04R 1/02* (2006.01)
*H04R 5/02* (2006.01)

(56) References Cited

U.S. PATENT DOCUMENTS

| | | | |
|---|---|---|---|
| 8,725,311 B1* | 5/2014 | Breed | A61B 5/11 |
| | | | 701/1 |
| 2009/0147962 A1* | 6/2009 | Sieben | H03G 9/18 |
| | | | 381/58 |
| 2016/0001781 A1* | 1/2016 | Fung | G07C 9/37 |
| | | | 701/36 |
| 2017/0154533 A1 | 6/2017 | Illy | |

OTHER PUBLICATIONS

European Patent Office, Extended European Search Report Issued in Application No. 22179889.5, Dec. 13, 2022, Germany, 10 pages.

\* cited by examiner

DRIVER ATTENTION SYSTEM

CROSS REFERENCE TO RELATED APPLICATIONS

The present application claims priority to European Patent Application No. 22179889.5, entitled "DRIVER ATTENTION SYSTEM", and filed on Jun. 20, 2022. The entire contents of the above-listed application is hereby incorporated by reference for all purposes.

TECHNICAL FIELD

The disclosure relates to a driver attention system, in particular to a system that determines and enhances driver's attention.

BACKGROUND

Drowsiness of a driver of a vehicle may severely reduce the driver's attention. A reduced driver attention due to drowsiness may increase the risk for accidents. Especially, the risk of fatal accidents may significantly increase when a driver is feeling drowsy. Therefore, driver fatigue has a huge impact on road safety. Drivers may be drowsy when driving at night or in the early morning, towards the end of a long journey, or for any other reason. Many advanced driver assistance systems (ADAS) monitor a driver's attention level/drowsiness level and generate a warning if it is detected that the attention level decreases and/or the drowsiness level increases. Such warnings may increase a driver's attention momentarily. However, warning signals of any kind (e.g., acoustical, visual, or haptic) may be perceived as disturbing or even annoying by a driver. Hence, there is a need for a system and method that allow to increase a driver's attention not only momentarily and without being perceived as disturbing or annoying by the driver.

SUMMARY

A driver attention system of the present disclosure is configured to determine a drowsiness level of a driver of a vehicle by means of data provided by a monitoring unit, the monitoring unit being configured to determine one or more driver parameters, based on the current drowsiness level, determine a current driver focus level and an estimated time of remaining driver focus level, wherein the driver focus level is inversely proportional to the drowsiness level, and determine an estimated remaining travel time until a desired destination is reached by means of data provided by a navigation system, wherein if, based on the current driver focus level, the estimated time of remaining focus level, and the estimated remaining travel time, it is determined that a current driver focus level is equal to or higher than a defined threshold focus level, and that the current driver focus level will decrease and fall below the defined threshold focus level during the estimated remaining travel time, a binaural beat at 20 Hz or higher is generated via at least two first loudspeakers of an audio system of the vehicle, wherein the binaural beat is audible for the driver.

The present disclosure further provides a method for increasing a focus level of a driver. The method includes determining a drowsiness level of a driver of a vehicle by means of data provided by a monitoring unit, the monitoring unit being configured to determine one or more driver parameters, based on the current drowsiness level, determining a current driver focus level and an estimated time of remaining driver focus level, wherein the driver focus level is inversely proportional to the drowsiness level, and determining an estimated remaining travel time of the vehicle until a desired destination is reached by means of data provided by a navigation system, wherein if, based on the current driver focus level, the estimated time of remaining focus level, and the estimated remaining travel time, it is determined that a current driver focus level is equal to or higher than a defined threshold focus level, and that the current driver focus level will decrease and fall below the defined threshold focus level during the estimated remaining travel time, a binaural beat at 20 Hz or higher is generated via at least two first loudspeakers of an audio system of the vehicle, wherein the binaural beat is audible for the driver.

Other systems, methods, features and advantages of the present disclosure will be or will become apparent to one with skill in the art upon examination of the following detailed description and figures. It is intended that all such additional systems, methods, features and advantages be included within this description, be within the scope of the invention and be protected by the following claims.

BRIEF DESCRIPTION OF THE DRAWINGS

The arrangement may be better understood with reference to the following description and drawings. The components in the figures are not necessarily to scale, emphasis instead being placed upon illustrating the principles of the invention. Moreover, in the figures, like referenced numerals designate corresponding parts throughout the different views.

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that directional terms that may be noted herein (e.g., "upper", "lower", "inner", "outer", "top", "bottom", etc.) simply refer to the orientation of various components of an arrangement as illustrated in the accompanying figures. Such terms are provided for context and understanding of the disclosed embodiments.

The driver attention system and related method according to the various embodiments described herein allow to increase a driver's focus level not only momentarily. With the described systems and methods, a driver's focus level may be increased for an extended period of time, thereby reducing the risk for accidents, especially the risk for fatal accidents. The driver attention systems and methods of the various embodiments allow to increase a driver's focus level without disturbing or annoying the driver.

Figure 1:
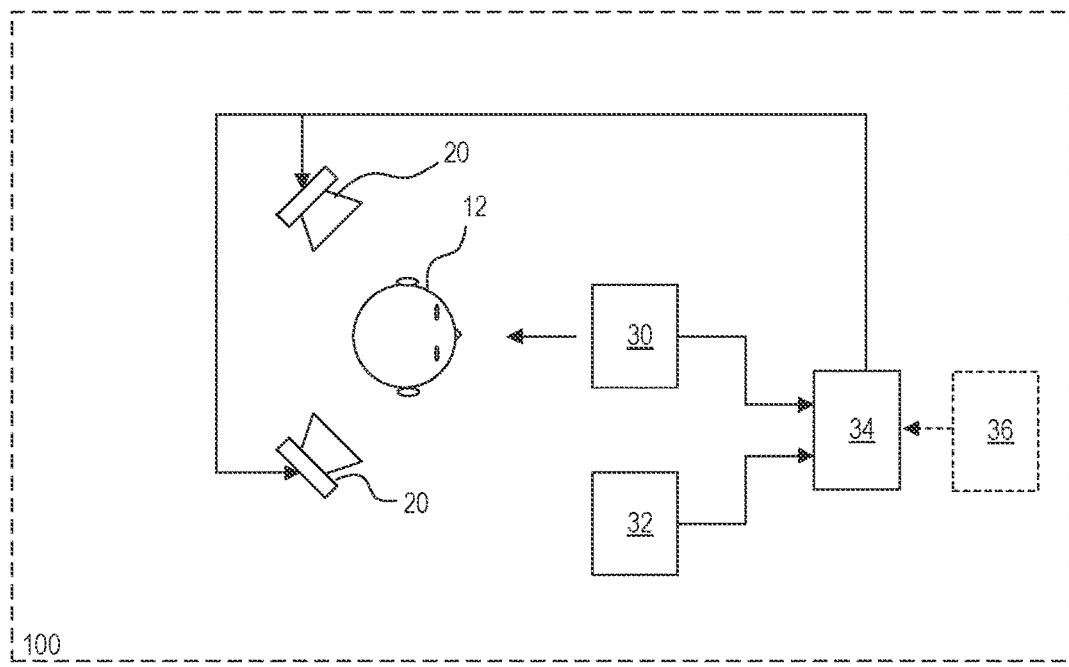
FIG. 1 schematically illustrates a driver attention system according to an embodiment of the present disclosure.

Referring to FIG. 1, an exemplary driver attention system 34 for a vehicle 100 is schematically illustrated. The driver attention system 34 includes or may be coupled to a monitoring unit 30. The driver attention system 34 may further include or may be coupled to a navigation system 32.

The navigation system 32 may be a built-in navigation system of the vehicle 100, or an external navigation system that may be configured to communicate with the driver attention system 34. An external navigation system may be a dedicated navigation system or any kind of electronic device that is configured to provide navigation information. The navigation system 32 and the driver attention system 34 may communicate in any suitable way, e.g., over a wired or a wireless connection.

The monitoring unit 30 may be a built-in monitoring unit of a vehicle 100, or an external monitoring unit that is configured to communicate with the driver attention system 34. The monitoring unit 30 and the driver attention system 34 may communicate in any suitable way, e.g., over a wired or a wireless connection.

The monitoring unit 30 is configured to determine one or more driver parameters that can be used to determine a driver drowsiness level. When the drowsiness level of a driver increases, a driver focus level generally decreases, and vice versa. That is, the driver focus level is inversely proportional to the drowsiness level. The driver focus level indicates a driver's ability to focus on the task of driving. A certain driver focus level is generally required for the driver 12 to be able to securely operate the vehicle 100. This currently required focus level may be preset to a suitable value (e.g., by a car manufacturer, or a manufacturer of the driver attention system 34) and may remain constant for the entire duration of a journey. It is, however, also possible to determine a required focus level based on a current driving situation. For example, when driving in heavy traffic, a higher focus level may be required for the driver 12 to be able to securely operate the vehicle 100, as compared to when driving in low traffic.

Therefore, optionally, the driver attention system 34 may include or may be coupled to a traffic monitoring unit 36 that is configured to determine a current driving situation. The traffic monitoring unit 36 may include sensors mounted on the vehicle 100 such as, e.g., cameras, RADAR, or LIDAR sensors, that are configured to monitor the surroundings of the vehicle 100. By means of such sensors it may be determined whether the vehicle 100 is driving in heavy or in low traffic, for example. It is, however, also possible that the traffic monitoring unit 36 receives information about a current traffic situation wirelessly from an independent source. For example, traffic information may be transmitted to the traffic monitoring unit 36 by means of radio signals or via a SIM card. The driver attention system 34 may receive information concerning a current driving situation from the traffic monitoring unit 36 and may determine a currently required driver focus level based on the current driving situation.

The drowsiness level of a driver 12 of the vehicle 100 may be determined in any suitable way. For example, the monitoring unit 30 may include one or more sensors. Sensors may include one or more cameras and/or biometric sensors, for example. Images of a driver's face provided by one or more cameras may be evaluated to determine a duration of eyelid closure and/or a frequency of eyelid closure, for example (number of eyelid closures per unit of time). Generally, fatigue affects both the duration of eyelid closure and the frequency of eyelid closure. For example, if a driver closes their eyes for a longer time, or if eyelid closure frequency increases, this may be an indication that the driver is becoming drowsy.

Biometric sensors may be used to specify neural activity associated with the user via a biometric signal. For instance, in some embodiments, a biometric sensor includes an electroencephalography (EEG) sensor that measures electrical activity of the driver's brain to generate a biometric signal. The biometric sensor may be situated in any technically feasible fashion that enables the biometric sensor to measure neural activity associated with the user. According to one out of several examples, a biometric sensor may be embedded in a headband worn by the driver, proximate to the user's brain. According to another example, it is additionally or alternatively possible to determine the drowsiness level by means of a driver's heartbeat. A driver's heartbeat may be determined by means of any kind of wearable device, for example.

In the same or other embodiments, the monitoring unit 30 may include any number and kind of biometric sensors. Each of the biometric sensors may specify a physiological or behavioral aspect of the driver relevant to determining a drowsiness level associated with the driver via a different biometric signal. Additional examples of biometric sensors include, without limitation, functional near-infrared spectroscopy (fNIRS) sensors, galvanic skin response sensors, acceleration sensors, eye gaze sensors, eye lid sensors, pupil sensors, eye muscle sensors, pulse sensors, heart rate sensors, and so forth.

Based on the current driver drowsiness level, the driver attention system 34 may then determine an estimated time of remaining driver focus. In order to determine the estimated time of remaining driver focus, the driver attention system 34 may, e.g., determine a current driver focus level based on the current drowsiness level, and compare the current driver focus level to the currently required driver focus level. The current driver focus level is generally greater if the drowsiness level is low, and is lower if the drowsiness level is high. As the drowsiness level increases, the focus level decreases, and vice versa.

If the current driver focus level is determined to be equal to or greater than the currently required driver focus level, it can be assumed that the driver 12 will still be able to keep their focus for at least a certain time. This estimated time of remaining driver focus is generally longer if the current driver focus level is significantly greater than the currently required driver focus level, and may be shorter if the current driver focus level is only marginally greater than or even equal to the currently required driver focus level. The estimated time of remaining driver focus can be determined in any suitable way, e.g., by means of a suitable algorithm based on the available data on the driver's drowsiness level and (optionally) a current driving situation. It is even possible to take into account a time of day, for example. A driver might be able to remain focused for a longer time when driving during the day as compared to when driving at night, for example.

The driver attention system 34 further receives information from the navigation system 32 concerning an estimated remaining travel time until a desired destination is reached. The estimated remaining travel time taken into account by the driver attention system 34 may correspond to an estimated remaining travel time for a currently selected route that is presented to a user on a display of the navigation system 32.

The driver attention system 34 then compares the time of remaining driver focus level to the estimated remaining travel time. If, based on comparing the estimated time of remaining driver focus level and the estimated remaining travel time, it is determined that a driver focus level that is above a defined threshold focus level can be maintained by the driver 12 during the estimated remaining travel time without additional measures, no action may be taken. The defined threshold focus level may correspond to the currently required driver focus level, for example.

If, based on comparing the estimated time of remaining driver focus level and the estimated remaining travel time, it is determined that a current driver focus level that is equal to or higher than a defined threshold focus level will decrease and fall below the defined threshold focus level during the estimated remaining travel time, a binaural beat is generated via at least two loudspeakers 20 of an audio system of the vehicle 100.

A binaural beat may be generated by providing to a user two pure tones (e.g., sine waves) at the same time, the tones having a slightly different frequency. Both tones may have a frequency of between 20 Hz and 1500 Hz, in order for the binaural beat to be audible for a user. The frequency difference between the two tones is generally less than 40 Hz. However, frequency differences of up to 100 Hz may also be possible. For example, a 530 Hz pure tone may be presented to the right ear of the driver 12, while a 520 Hz pure tone is presented to the left ear of the driver 12. Any other frequencies between 20 Hz and 1500 Hz with a frequency difference of less than 40 Hz (or less than 100 Hz), however, are also possible. The driver 12 will perceive the auditory illusion of a third tone, in addition to the two pure tones presented to each ear. In other words, the two pure tones produce a third tone perceived by the driver 12, the third tone having a different frequency than the first pure tone and the second pure tone. In particular, the frequency of the third tone corresponds to the difference between the frequencies of the first pure tone and the second pure tone. That is, the frequency of the third tone is generally less than 40 Hz. This third tone is generally referred to as binaural beat.

Binaural beat perception generally originates in the inferior colliculus of the midbrain and the superior olivary complex of the brainstem, where auditory signals from each ear are integrated and precipate electrical impulses along neural pathways through the reticular formation up to the midbrain to the thalamus, auditory cortex, and other cortical regions.

Binaural beats at certain frequencies reduce stress and anxiety, and increase concentration. By presenting binaural beats to a driver 12, it is therefore possible to maintain their current focus level, or to even increase the focus level. A binaural beat (third tone) at frequencies of 20 Hz or higher (e.g., between 20 Hz and 40 Hz, or between 20 Hz and 100 Hz) may be more suitable to keep the driver's attention focused, stimulate the driver's energy and action, and increase the driver's cognitive enhancement than binaural beats of less than 20 Hz.

That is, by generating the binaural beat, the driver focus level may be prevented from falling below the defined threshold focus level before the end of the journey.

A binaural beat may also be generated and presented to the driver 12 in a case where the current driver focus level is determined to be less than the defined threshold focus level, but where it is possible to recover the driver focus level to a level above the defined threshold focus level within a specified period of time (e.g., within the next 10 minutes, the next 20 minutes or the next 30 minutes). It may be tolerable for the driver 12 to operate the vehicle 100 for a short period of time, even if their current driver focus level is considered too low. However, this period of time should be kept as short as possible for safety reasons. It is also possible to guide the driver 12 to the next parking opportunity immediately, while presenting a binaural beat. The driver may then listen to the binaural beat while not operating the vehicle and only resume driving when the driver focus level is detected to have regained and being above the defined threshold focus level again. If the driver 12 is presented with a binaural beat while not operating the vehicle, they may be presented with a binaural beat at frequencies of 20 Hz or higher, for example, in order to increase the driver's focus. Alternatively, it is also possible to present the driver 12 with a binaural beat of less than 20 Hz in order to relax the driver 12. This may also help to resume the driver's focus level before they take up driving again. Alternatively, it is also possible to first present the driver 12 with a binaural beat at frequencies of less than 20 Hz to relax the driver 12 and, after a certain time, present the driver 12 with a binaural beat at frequencies of 20 Hz or higher to increase the driver's focus level before they take up driving again.

If it is determined that the current driver focus level is below the defined threshold focus level and cannot be recovered to a level above the defined threshold focus level within a specified period of time (e.g., within the next 10 minutes, the next 20 minutes or the next 30 minutes), the driver 12 can be provided with information about suitable parking opportunities. In this latter case, it can be assumed that the required driver focus level cannot be regained fast enough even if appropriate measures, such as generating a binaural beat, are taken. The driver may more likely cause an accident if their focus level is too low and may therefore be guided to a parking opportunity to be able to rest. The driver may then presented with a binaural beat while not operating the vehicle and only resume driving when the driver focus level is detected to have regained and being above the defined threshold focus level again.

Figure 2:
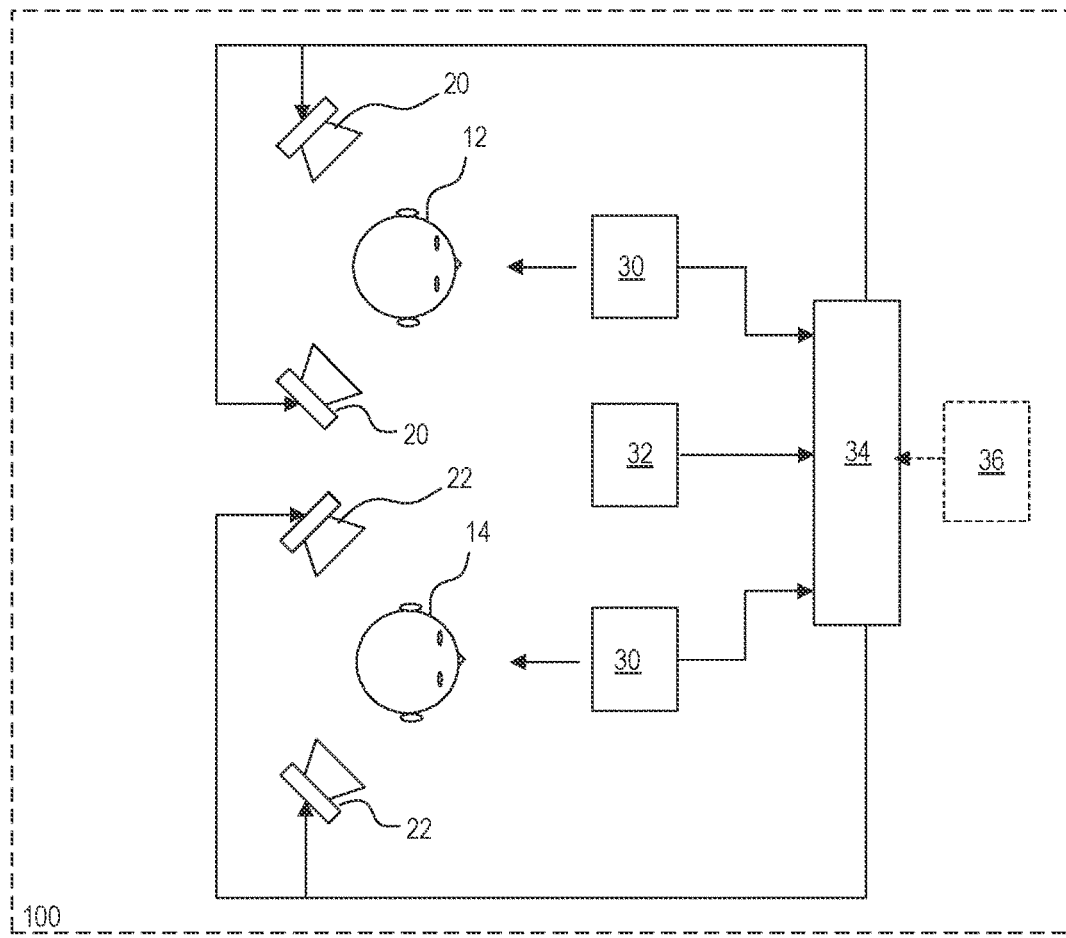
FIG. 2 schematically illustrates a driver attention system according to another embodiment of the present disclosure.

The driver attention system 34 may be further configured to determine whether one or more passengers 14 are present in the vehicle 100, who may replace the current driver 12. A situation in which one passenger 14 is present in the vehicle 100 in addition to the driver 12 is exemplarily illustrated in FIG. 2. The presence of a passenger 14 may be determined by means of one or more sensors, for example. For example, one or more sensors (e.g., weight sensors, capacitive sensors, etc.) may be arranged in a passenger seat that are configured to detect whether a person is seated on the passenger seat. It is also possible to determine whether a person is seated in a passenger seat by means of cameras, for example. Any other suitable kind of sensors, however, may be used instead. It is, e.g., also possible that the presence of a passenger 14 is detected if an additional mobile phone is arranged inside the vehicle 100, or by means of manual input by a driver 12 or passenger 14 via an interface of the driver attention system 34.

If a passenger 14 is present in the vehicle 100, the monitoring unit 30 may not only be configured to determine one or more driver parameters that can be used to determine a driver drowsiness level, but also to determine one or more passenger parameters that can be used to determine a passenger drowsiness level. The passenger drowsiness level may be determined in the same way as the driver drowsiness level. Based on the current drowsiness level, a current passenger focus level and an estimated time of remaining passenger focus level may be determined, similar to what has been described above with respect to the driver 12. The estimated time of remaining passenger focus level and the estimated remaining travel time may be compared to each other, similar to what has been described above with respect to the driver 12.

If it is determined that the current driver focus level is below the defined threshold focus level and cannot be recovered to a level above the defined threshold focus level within a specified period of time (e.g., within the next 10 minutes, the next 20 minutes or the next 30 minutes), and the current passenger focus level is below the defined threshold focus level and cannot be recovered to a level above the defined threshold focus level within a specified period of time (e.g., within the next 10 minutes, the next 20 minutes or the next 30 minutes), the driver 12 can be provided with information about suitable parking opportunities, as has been described above.

The driver 12 and the passenger 14 may then both be presented with a binaural beat in order to increase the driver focus level and the passenger focus level. If one of the driver 12 or passenger focus level has sufficiently recovered, the journey may be continued. The driver 12 and the passenger 14 may be presented with the same or with different binaural beats. The binaural beat presented to the driver 12 and the passenger 14 may depend on the driver focus level and the passenger focus level, for example.

If it is determined that the current driver focus level is below the defined threshold focus level and cannot be recovered to a level above the defined threshold focus level within a specified period of time (e.g., within the next 10 minutes, the next 20 minutes or the next 30 minutes), and the current passenger focus level is above the defined threshold focus level and can be maintained by the passenger 14 during the estimated remaining travel time without additional measures, a change of driver may be proposed to the driver 12 and passenger 14 without additional measures. Optionally, it may be determined whether the passenger 14 is authorized to drive the vehicle (e.g., whether the passenger 14 has a driver's license or whether additional drivers are covered by the vehicle insurance). This may require user input, for example. For example, the passenger 14 may be required to confirm via a suitable interface that they are authorized to drive the vehicle. If this is not the case (e.g., the passenger 14 is a minor and/or does not have a valid driver's license), the driver 12 may be provided with information about the next parking opportunity instead. It is, however, also possible that a passenger 14 is identified by means of face recognition techniques and an authorization of the passenger 14 is stored in some kind of user profile and can be automatically retrieved when the passenger 14 has been identified.

If it is determined that the current driver focus level is below the defined threshold focus level and cannot be recovered to a level above the defined threshold focus level within a specified period of time (e.g., within the next 10 minutes, the next 20 minutes or the next 30 minutes), and the current passenger focus level is above the defined threshold focus level but cannot be maintained by the passenger 14 during the estimated remaining travel time without additional measures, a change of driver may be proposed to the driver 12 and passenger 14. Once the passenger 14 has changed to the driver's seat, a binaural beat may be generated to be perceived by the passenger (which is then the driver) via at least two loudspeakers 20 of the audio system of the vehicle 100.

If it is determined that the current driver focus level is above the defined threshold focus level but cannot be maintained by the passenger 14 during the estimated remaining travel time without additional measures, and a passenger 14 that is generally able to operate the vehicle 100 (e.g., has a driver's license) is present in the vehicle 100, a first binaural beat may be generated to be perceived by the driver 12 via at least two first loudspeakers 20 of the audio system, and a second binaural beat that is different from the first binaural beat may be generated to be perceived by the passenger 14 via at least two second loudspeakers 22 of the audio system. The first binaural beat may be a binaural beat (third tone) at frequencies of 20 Hz or higher (e.g., between 20 Hz and 40 Hz, or between 20 Hz and 100 Hz) that is suitable to keep the driver's attention focused, stimulate the driver's energy and action, and increase the driver's cognitive enhancement. The second binaural beat may be a binaural beat (third tone) at frequencies of less than 20 Hz. Binaural beats of less than 20 Hz, e.g., between 8 and 13 Hz, generally reduce stress, increase relaxation, and ease tensions. That is, while the driver's 12 attention is increased to maintain the driver focus level, the passenger's 14 relaxation is supported. Should it become necessary to propose a driver's change during the remaining travel time, the passenger 14 would be more relaxed (current passenger focus level would be higher) when taking over the vehicle 100.

The at least two first loudspeakers 20 may be arranged in a headrest of a driver's seat, for example, while the at least two second loudspeakers 22 may be arranged in a headrest of a passenger's seat. Any other arrangement of the first and (optional) second loudspeakers 20, 22 within the vehicle 100 is also possible which allows to present binaural beats to the driver 12 and (optionally) the passenger 14.

When it is determined that a binaural beat is to be presented to the driver 12 and/or the passenger 14, it may be determined whether sound is already output by the sound system. For example, music or speech of any kind may be presented to the driver 12 and/or the passenger 14 via the sound system. In this case, the sound that is already output by the sound system may continue and the required binaural beat may be generated in addition to the sounds already being output. That is, a sound currently reproduced by the sound system may be "enhanced" with the binaural beat. If no sound is currently being output by the sound system, suitable sound (e.g. suitable musical pieces) may be chosen from an available source which may subsequently be output by the sound system in addition to the binaural beat. Presenting a pure binaural beat to a driver 12 or passenger 14 may be considered to be monotonous. Therefore, it may be more pleasant for the driver 12 and passenger 14 if the binaural beat is embedded in a musical piece or any kind of natural sounds, for example.

The driver drowsiness level, driver focus level, and estimated remaining travel time and (optionally) passenger drowsiness level, and passenger focus level may be monitored at regular intervals throughout the entire journey. According to one example, the different parameters are determined every few seconds, or every few minutes. Other time intervals are also possible. It is also possible to constantly monitor the different parameters. In this way, the system is able to determine without significant delay whether the driver 12 is still able to safely operate the vehicle 100, if a binaural beat is to be generated, if a change of driver is to be proposed, etc. Any changes to a current situation will be detected without significant delay.

Figure 3:
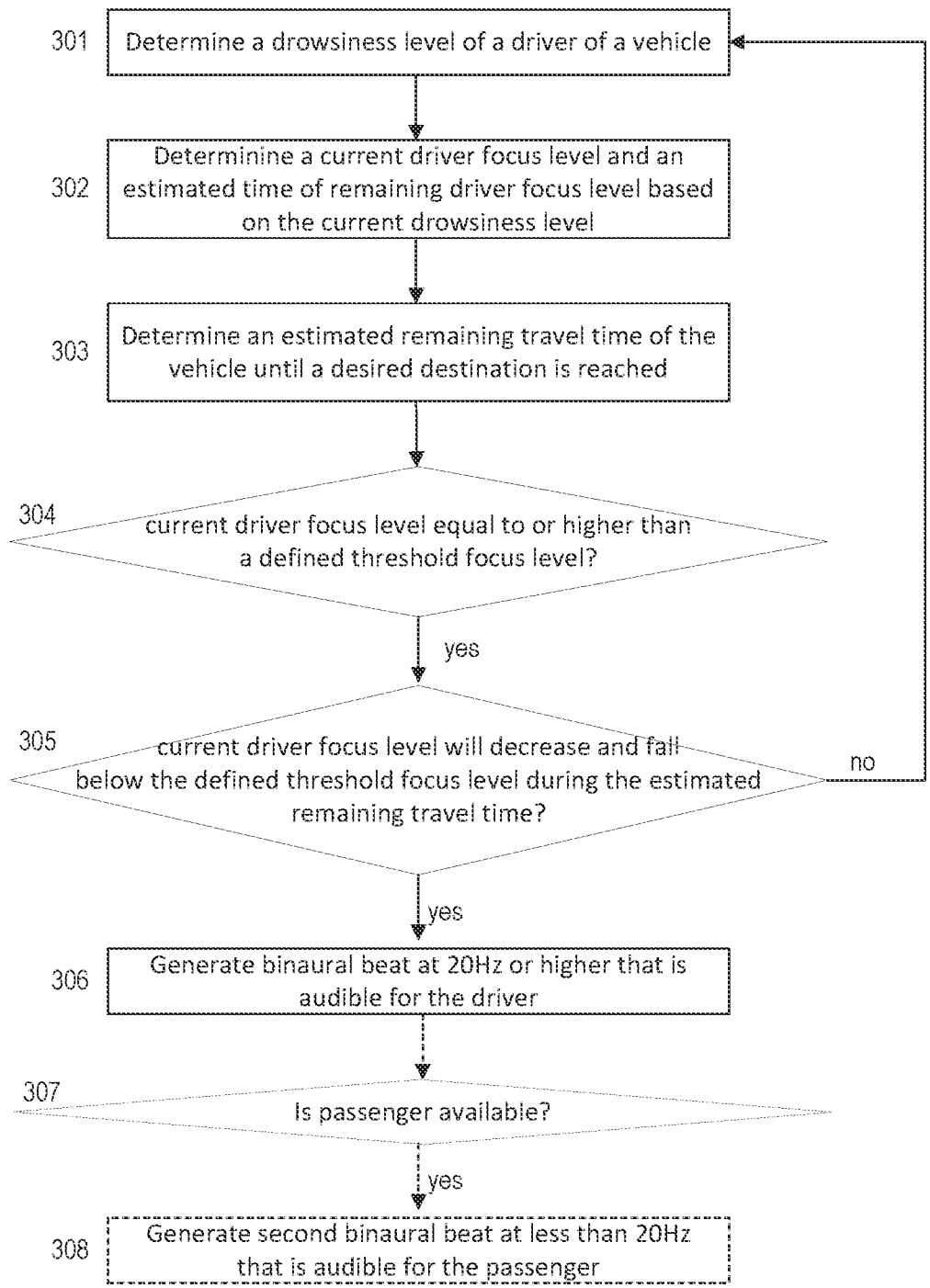
FIG. 3 schematically illustrates a flow chart of a method for detecting and enhancing a driver's attention according to yet another embodiment of the present disclosure.

Now referring to FIG. 3, a method is exemplarily illustrated. The method includes determining a drowsiness level of a driver of a vehicle (step 301) by means of data provided by a monitoring unit, the monitoring unit being configured to determine one or more driver parameters. Based on the current drowsiness level, a current driver focus level and an estimated time of remaining driver focus level are determined (step 302), wherein the driver focus level is inversely proportional to the drowsiness level. The method further includes determining an estimated remaining travel time of the vehicle until a desired destination is reached (step 303) by means of data provided by a navigation system. If, based on the current driver focus level, the estimated time of remaining focus level, and the estimated remaining travel time, it is determined that a current driver focus level is equal to or higher than a defined threshold focus level (step 304), and that the current driver focus level will decrease and fall below the defined threshold focus level during the estimated remaining travel time (step 305), a binaural beat at 20 Hz or higher is generated via at least two first loudspeakers 20 of an audio system of the vehicle 100 (step 306), wherein the binaural beat is audible for the driver 12.

Optionally (indicated in dashed lines in FIG. 3), the method may further include determining whether a passenger 14 is present in the vehicle 100 (step 306), and, if a passenger 14 is present in the vehicle 100, generating a second binaural beat at less than 20 Hz that is audible for the passenger 14 (step 307). The second binaural beat may be generated independent of a current drowsiness level of the passenger 14. According to another example, however, it may also be possible that a second binaural beat audible for the passenger 14 is only generated if, based on a current passenger focus level, the estimated time of remaining passenger focus level, and the estimated remaining travel time, it is determined that a current passenger focus level is equal to or higher than the defined threshold focus level, and that the current passenger focus level will decrease and fall below the defined threshold focus level during the estimated remaining travel time.

Figure 4:
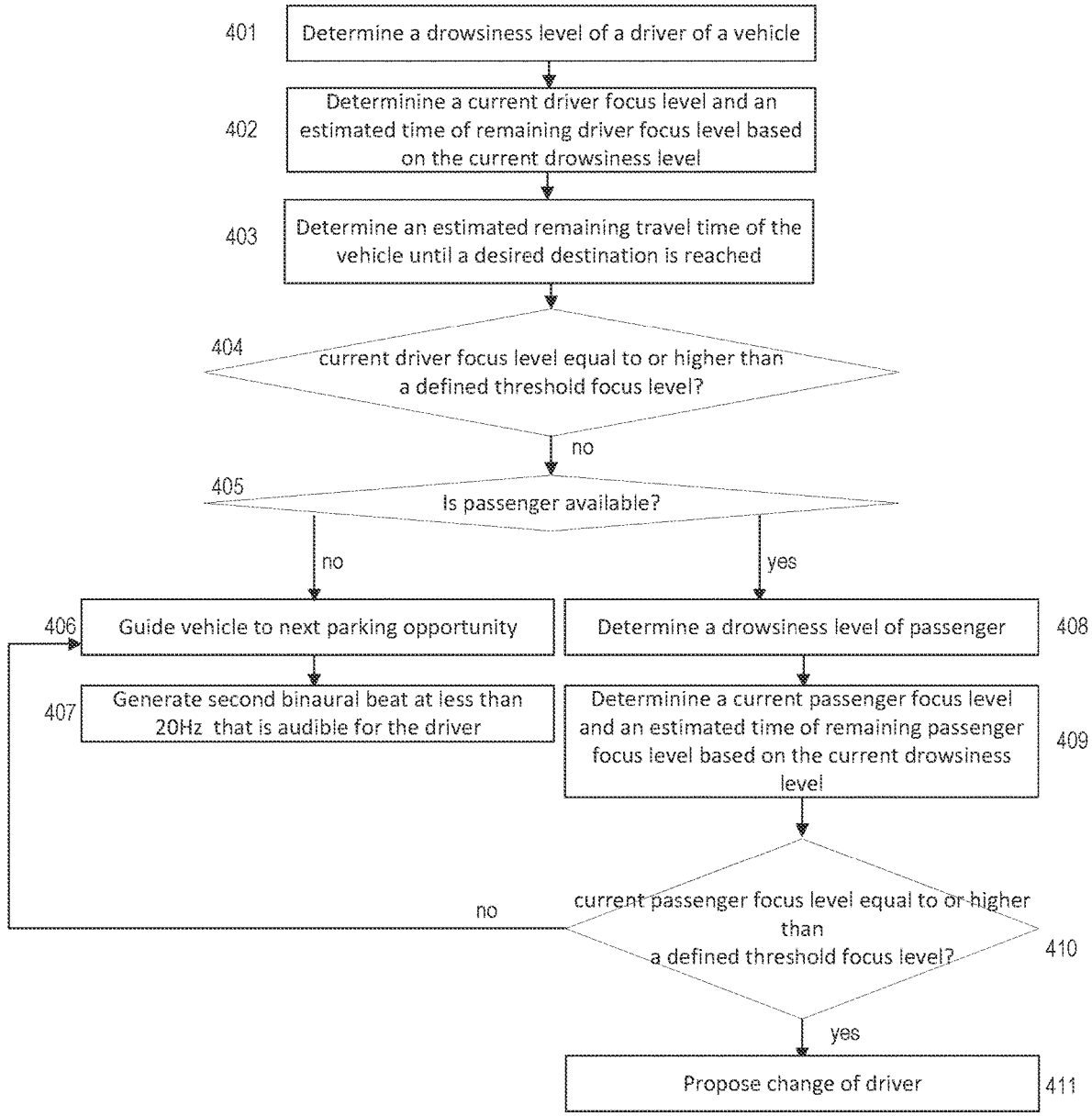
FIG. 4 schematically illustrates a flow chart of a method for detecting and enhancing a driver's attention according to still another embodiment of the present disclosure.

Now referring to FIG. 4, another method is exemplarily illustrated. The first steps correspond to what has been described with respect to FIG. 3 above. In particular, the method includes determining a drowsiness level of a driver of a vehicle (step 401) by means of data provided by a monitoring unit, the monitoring unit being configured to determine one or more driver parameters. Based on the current drowsiness level, a current driver focus level and an estimated time of remaining driver focus level are determined (step 402), wherein the driver focus level is inversely proportional to the drowsiness level. The method further includes determining an estimated remaining travel time of the vehicle until a desired destination is reached (step 403) by means of data provided by a navigation system. If, based on the current driver focus level, the estimated time of remaining focus level, and the estimated remaining travel time, it is determined that a current driver focus level is less than a defined threshold focus level (step 404), it is determined whether a passenger is available (step 405).

If no passenger is available, the driver is guided to the next parking opportunity (step 406). Once the driver reached the parking opportunity, a binaural beat at less than 20 Hz that is audible for the driver is generated in order to relax the driver (step 407).

Optionally, a minimum rest period may be proposed to the driver. For example, the driver 12 may be provided with information about a minimum rest period that is required to sufficiently increase the driver focus level to be able to continue driving. It is also possible to generate a signal of any kind (visual, acoustic, haptic), when the minimum rest time has lapsed and the driver 12 may continue driving.

If a passenger 14 is available, the method includes determining a drowsiness level of the passenger (step 408) by means of data provided by a monitoring unit, the monitoring unit being configured to determine one or more driver parameters. Based on the current drowsiness level, a current passenger focus level and an estimated time of remaining passenger focus level are determined (step 409), wherein the passenger focus level is inversely proportional to the drowsiness level. If, based on the current passenger focus level, the estimated time of remaining focus level, and the estimated remaining travel time, it is determined that a current passenger focus level is equal to or greater than the defined threshold focus level (step 410), a change of driver is proposed to the driver and the passenger (step 411).

Optionally, it is then possible to present a first binaural beat of at least 20 Hz to the passenger 14 (who is then the driver), and a second binaural beat of less than 20 Hz to the driver 12 (who is then the passenger).

The description of embodiments has been presented for purposes of illustration and description. Suitable modifications and variations to the embodiments may be performed in light of the above description or may be acquired from practicing the methods. The described arrangements are exemplary in nature, and may include additional elements and/or omit elements. As used in this application, an element recited in the singular and proceeded with the word "a" or "an" should not be understood as excluding the plural of said elements, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The described systems are exemplary in nature, and may include additional elements and/or omit elements. The subject matter of the present disclosure includes all novel and non-obvious combinations and sub-combinations of the various systems and configurations, and other features, functions, and/or properties disclosed. The following claims particularly disclose subject matter from the above description that is regarded to be novel and non-obvious.

The invention claimed is:

1. A driver attention system for a vehicle, comprising:
   a navigation system; and
   an audio system having at least two first loudspeakers;
   wherein the driver attention system is configured to:
      determine one or more driver parameters of a driver of the vehicle via a monitoring unit of the vehicle,
      determine a current drowsiness level of the driver based on the determined one or more driver parameters,
      determine a current driver focus level and an estimated time of remaining driver focus level based on the determined current drowsiness level, wherein the driver focus level is inversely proportional to the current drowsiness level,
      determine an estimated remaining travel time until a desired destination is reached using data provided by the navigation system, and
      generate a binaural beat, audible for the driver, via the at least two first loudspeakers of the audio system based on a determination that the current driver focus level is equal to or higher than a defined threshold focus level, and that the current driver focus level will decrease and fall below the defined threshold focus level during the estimated remaining travel time;

wherein the binaural beat comprises a first pure tone at a first frequency of between 20 Hz and 1500 Hz presented to a right ear of the driver, and a second pure tone at a second frequency of between 20 Hz and 1500 Hz presented to a left ear of the driver, wherein a difference between the first frequency and the second frequency is between 20 Hz and 100 Hz, or between 20 Hz and 40 Hz.

2. The driver attention system of claim 1, wherein the one or more driver parameters include one or more of a duration of eyelid closure and a frequency of eyelid closure.

3. The driver attention system of claim 1, wherein the defined threshold focus level to which the current driver focus level is compared corresponds to a currently required driver focus level, the currently required driver focus level a preset value established by one of a manufacturer of the vehicle and a manufacturer of the driver attention system.

4. The driver attention system of claim 3, wherein determining the estimated time of remaining driver focus level further comprises comparing the current driver focus level to the currently required driver focus level, and in response to the current driver focus level being greater than the currently required driver focus level, estimating the time of remaining driver focus level.

5. The driver attention system of claim 3, wherein
either the currently required driver focus level is preset to a defined value and remains constant for an entire duration of a journey, or
the driver attention system is configured to receive information about a current driving situation from a traffic monitoring unit, and to determine the currently required driver focus level based on the current driving situation.

6. The driver attention system of claim 1, wherein the driver attention system is further configured to determine whether a passenger is present in the vehicle.

7. The driver attention system of claim 6, wherein the driver attention system is further configured to generate a second binaural beat audible for the passenger at less than 20 Hz via at least two second loudspeakers of the audio system of the vehicle, based on the current driver focus level, the estimated time of remaining focus level, and the estimated remaining travel time, in response to the determination that the current driver focus level is equal to or higher than the defined threshold focus level, and that the current driver focus level will decrease and fall below the defined threshold focus level during the estimated remaining travel time.

8. The driver attention system of claim 7, wherein the driver attention system is configured to generate the second binaural beat by presenting a third pure tone at a third frequency of between 20 Hz and 1500 Hz to the right ear of the passenger, and presenting a fourth pure tone at a fourth frequency of between 20 Hz and 1500 Hz to the left ear of the passenger, wherein a difference between the third frequency and the fourth frequency is between 0 Hz and 20 Hz, or between 8 Hz and 13 Hz.

9. The driver attention system of claim 1, wherein the driver attention system is further configured to embed the binaural beat into an audio signal that is already played back via the audio system of the vehicle.

10. The driver attention system of claim 1, wherein the driver attention system is further configured to start playing a new audio signal from a source accessible by the audio system and to embed the binaural beat into the new audio signal, based on a determination that no audio signal is being played back by the audio system of the vehicle.

11. The driver attention system of claim 9, wherein the audio signal is a musical piece or a natural sound.

12. A method for a vehicle, the method comprising:
determining one or more driver parameters of a driver of the vehicle, via a monitoring unit of the vehicle;
determining a current drowsiness level of the driver based on the determined one or more driver parameters;
determining a current driver focus level and an estimated time of remaining driver focus level based on the determined current drowsiness level, wherein the driver focus level is inversely proportional to the current drowsiness level;
determining an estimated remaining travel time of the vehicle until a desired destination is reached using data provided by a navigation system of the vehicle; and
generating a binaural beat, audible for the driver, via at least two first loudspeakers of an audio system of the vehicle based on a determination that the current driver focus level is equal to or higher than a defined threshold focus level, and that the current driver focus level will decrease and fall below the defined threshold focus level during the estimated remaining travel time;
wherein generating the binaural beat further comprises presenting a first pure tone at a first frequency of between 20 Hz and 1500 Hz to a right ear of the driver, and presenting a second pure tone at a second frequency of between 20 Hz and 1500 Hz to a left ear of the driver, wherein a difference between the first frequency and the second frequency is between 20 Hz and 100 Hz, or between 20 Hz and 40 Hz.

13. The method of claim 12, further comprising determining whether a passenger is present in the vehicle.

14. The method of claim 13, further comprising generating a second binaural beat at less than 20 Hz that is audible for the passenger in response to the passenger being present in the vehicle.

15. A driver attention system configured to:
determine a drowsiness level of a driver of a vehicle based on data provided by a monitoring unit, the monitoring unit being configured to determine one or more driver parameters;
based on the drowsiness level, determine a current driver focus level and an estimated time of remaining driver focus level, wherein the driver focus level is inversely proportional to the drowsiness level;
determine an estimated remaining travel time until a desired destination is reached based on data provided by a navigation system,
compare the estimated time of remaining driver focus level to the estimated remaining travel time, and
determine, based on the comparison of the remaining driver focus level to the estimated remaining travel time, that the current driver focus level is equal to or higher than a defined threshold focus level, and that the current driver focus level will decrease and fall below the defined threshold focus level during the estimated remaining travel time; and in response, generate a binaural beat at 20 Hz or higher via at least two first loudspeakers of an audio system of the vehicle, wherein the binaural beat is audible for the driver.

16. The driver attention system of claim 15, wherein the binaural beat comprises a first pure tone at a first frequency of between 20 Hz and 1500 Hz presented to a right ear of the driver, and a second pure tone at a second frequency of between 20 Hz and 1500 Hz presented to a left ear of the driver.

17. The driver attention system of claim 16, wherein a difference between the first frequency and the second frequency is between 20 Hz and 100 Hz, or between 20 Hz and 40 Hz.

* * * * *